(12) United States Patent
Matsuo et al.

(10) Patent No.: US 9,698,957 B2
(45) Date of Patent: Jul. 4, 2017

(54) WIRELESS COMMUNICATION DEVICE AND COMMUNICATION CONTROL METHOD

(71) Applicant: Panasonic Corporation, Osaka (JP)

(72) Inventors: Hidenori Matsuo, Kanagawa (JP); Takahisa Aoyama, Kanagawa (JP); Takashi Tamura, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 364 days.

(21) Appl. No.: 14/131,884

(22) PCT Filed: Nov. 19, 2012

(86) PCT No.: PCT/JP2012/007411
§ 371 (c)(1),
(2) Date: Jan. 9, 2014

(87) PCT Pub. No.: WO2013/105167
PCT Pub. Date: Jul. 18, 2013

(65) Prior Publication Data
US 2014/0153436 A1 Jun. 5, 2014

(30) Foreign Application Priority Data

Jan. 12, 2012 (JP) .................................. 2012-004237

(51) Int. Cl.
*H04L 12/58* (2006.01)
*H04L 5/00* (2006.01)
(Continued)

(52) U.S. Cl.
CPC ........... *H04L 5/0058* (2013.01); *H04B 7/024* (2013.01); *H04L 43/0888* (2013.01); *H04W 16/14* (2013.01); *H04W 72/0426* (2013.01)

(58) Field of Classification Search
USPC .......................... 370/329, 330, 331, 333, 338
See application file for complete search history.

(56) References Cited

U.S. PATENT DOCUMENTS

2012/0051265 A1* 3/2012 Shen ..................... H04L 5/0035
370/254
2012/0172076 A1 7/2012 Seki
(Continued)

FOREIGN PATENT DOCUMENTS

JP 2011-61728 A 3/2011

OTHER PUBLICATIONS

International Search Report for Application No. PCT/JP2012/007411 dated Feb. 19, 2013.

*Primary Examiner* — Zewdu A Beyen
(74) *Attorney, Agent, or Firm* — Pearne & Gordon, LLP

(57) ABSTRACT

A wireless communication device is provided with: a means that, when traffic of said device is greater than another device in a state in which the device is wirelessly connected to a terminal without using CoMP, generates information with which a parameter is altered so that a communication area in which CoMP is used is expanded at the wireless communication device side, said parameter relating to a condition by which the terminal reports a result of a communication measurement between the device and the other device; and a means that carries out an adjustment so that a proportion of resources for communication using CoMP is increased in accordance with the traffic situations of the device and the other device.

6 Claims, 14 Drawing Sheets

(51) Int. Cl.
*H04B 7/024* (2017.01)
*H04L 12/26* (2006.01)
*H04W 16/14* (2009.01)
*H04W 72/04* (2009.01)

(56) References Cited

U.S. PATENT DOCUMENTS

| | | | |
|---|---|---|---|
| 2012/0178462 A1* | 7/2012 | Kim | H04W 72/048 |
| | | | 455/450 |
| 2012/0188950 A1* | 7/2012 | Luo | H04L 5/0035 |
| | | | 370/329 |
| 2012/0221673 A1* | 8/2012 | Lee | H04L 67/1095 |
| | | | 709/213 |

* cited by examiner

WIRELESS COMMUNICATION DEVICE AND COMMUNICATION CONTROL METHOD

TECHNICAL FIELD

The present invention relates to a wireless communication device and a communication control method that enable performing a communication with a wireless communication terminal by utilization of a coordinated multiple point transmission/reception technique in coordination with another adjacent wireless communication device.

BACKGROUND ART

The standard setting organization 3GPP (the $3^{rd}$ Generation Partnership Project) has conducted a study of a LTE-Advanced (Long Term Evolution Advanced: LTE-A) scheme which is an advanced type of the LTE (Long Term Evolution) scheme. In connection with the LTE-A scheme, a CoMP (Coordinated Multi-point transmission/reception) technique has been under consideration as a technique for fulfilling system performance requirements, such as a frequency utilization factor (required system capacity) and cell edge throughput. The CoMP technique is one by means of which a wireless communication terminal (UE: User Equipment) transmits and receives a signal by use of a plurality of sectors or cells. Under the technique, a plurality of cells perform transmission and reception in coordination with each other, so that reducing interference from another cell and augmenting electric power of a desired signal can be realized.

Roughly two types are conceivable as a method for realizing the CoMP technique. A method of one type is a CoMP technique utilized between a remote base station (RRE: Remote Radio Equipment), such as an outlying base station, and an integrated control base station that performs integrated control of a plurality of pieces of RRE. Since the RRE and the integrated control base station are connected to each other by use of an optical fiber, a signaling delay is little. In addition, since the integrated control base station can perform integrated control of resources to be employed by the CoMP, implementing the CoMP technique is comparatively easy.

A method of another type is a CoMP technique employed among a plurality of independent base stations. In an UMTS system in which signals are simultaneously transmitted from a plurality of base stations, an RNC that is an integrated control station has a function of managing resources of the plurality of base stations, and each of the base stations controls its resource with respect to the RNC. An LTE system, however, does not have any RNCs, and each base station has a resource management function that is carried out by the RNC. Therefore, under the CoMP technique that controls resources of a plurality of independent base stations, the independent base stations must perform a negotiation with each other over resources for CoMP transmission purpose. To be specific, one base station (a master base station) among base stations that are to carry out CoMP communication makes a request to another base station (a slave base station) that carries out coordinated multiple point transmission/reception for a CoMP transmission resource, thereby assuring the CoMP transmission resource. Moreover, the master base station performs scheduling for the terminal that is to carry out the CoMP communication, by use of the thus-assured CoMP transmission resource. In the meantime, the slave base station receives from the master base station information about a resource scheduled by the master base station. Under the CoMP technique, data to be used for the CoMP communication are transferred to the slave base station by way of the master base station, whereby the plurality of independent base stations actualize coordinated multiple point transmission/reception.

SUMMARY OF THE INVENTION

Problem that the Invention is to Solve

When the coordinated multiple point transmission/reception scheme that has been discussed in the 3GPP, like JT (Joint Transmission), is applied to the CoMP technique, both the master base station and the slave base station must assure the same resource for coordinated multiple point transmission/reception. Furthermore, the slave base station cannot share a resource assured for coordinated multiple point transmission/reception with a certain master base station and a resource for coordinated multiple point transmission/reception with another master base station or a resource for a non-CoMP terminal subordinate to the slave base station. For these reasons, a base station compatible with the CoMP technique must in advance separate a coordinated multiple point transmission/reception resource from a resource for a non-CoMP terminal and fixedly allocate the coordinated multiple point transmission/reception resource to each of base stations. FIG. 14 is a drawing showing an example of allocating resources to base stations compatible with the CoMP technique. In the example shown in FIG. 14, a non-CoMP resource, a CoMP resource for a base station BS2, a CoMP resource for a base station BS3, and a CoMP resource for a base station BS4 are respectively allocated in a fixed manner.

If a CoMP resource and a non-CoMP resource are fixedly allocated to the respective base stations, a conflict between resources for coordinated multiple point transmission/reception, which would occur between the base stations, can be circumvented. However, allocation of resources cannot be flexibly changed in accordance with traffic of each of the base station. For instance, even when an increase occurs in traffic with the terminal to which a non-CoMP technique is applied and when a decrease occurs in traffic with the terminal to which the CoMP technique is applied, a base station that provides a cell of interest cannot decrease the CoMP resource and increase the non-CoMP resource. For these reasons, the load on the base station stemming from traffic increase cannot be lessened by execution or termination of a flexible CoMP communication.

An objective of the invention is to provide a wireless communication device and a communication control method that enable lessening of load on a high traffic wireless communication device in accordance with a traffic status of each of wireless communication devices that can utilize a coordinated multiple point transmission/reception (CoMP) technique.

Means for Solving the Problem

According to one aspect of the invention, there is provided a wireless communication device capable of performing a communication with a wireless communication terminal by utilization of a coordinated multiple point transmission/reception technique and in coordination with another wireless communication device, comprising:

a traffic calculation section configured to calculate traffic of a wireless communication device of interest;

a network communication section configured to transmit and receive information representing traffic of the wireless communication device of interest and information representing traffic of the other wireless communication device; and a resource adjustment section configured to, according to a traffic status of the wireless communication device of interest and a traffic status of the other wireless communication device, make a change to a proportion of a resource for which a request is made to the other wireless communication device and which is used in communication utilizing the coordinated multiple point transmission/reception technique to a resource used in communication not utilizing the coordinated multiple point transmission/reception technique.

According to another aspect of the invention, there is provided a wireless communication device capable of performing communication with a wireless communication terminal by utilization of a coordinated multiple point transmission/reception and in coordination with another adjacent wireless communication device, comprising:

a traffic calculation section configured to calculate traffic of a wireless communication device of interest;

a network communication section configured to transmit and receive information showing the traffic of the wireless communication device of interest and information showing traffic of the other wireless communication device; and a coordinated multiple point transmission/reception control section configured to allow a resource, which is utilized during performance of a communication utilizing the coordinated multiple point transmission/reception technique, to carry out the communication utilizing the coordinated multiple point transmission/reception technique when information pertinent to a resource used in communication utilizing the coordinated multiple point transmission/reception technique is received from the other wireless communication device.

According to another aspect of the invention, there is provided a communication control method that is carried out by a wireless communication device capable of performing a communication with a wireless communication terminal by utilization of coordinated multiple point transmission/reception technique and in coordination with another wireless communication device, the method comprising:

calculating traffic of a wireless communication device of interest;

transmitting and receiving information representing traffic of the wireless communication device of interest and traffic of the other wireless communication device; and, when the traffic of the wireless communication device of interest is higher than traffic of the other wireless communication device while the wireless communication device of interest remains in wireless communication with the wireless communication terminal without utilizing the coordinated multiple point transmission/reception technique, making a change to a parameter pertinent to a requirement by means of which there is reported a result of measurement of communication between the wireless communication device and the other wireless communication device made by the wireless communication terminal, such that an area over which the wireless communication terminal performs a communication by utilization of the coordinated multiple point transmission/reception technique becomes wider toward the wireless communication device of interest, and making a change such that a resource, among resources allocated to the other wireless communication device, used in communication that utilizes the coordinated multiple point transmission/reception technique becomes greater in proportion.

According to another aspect of the invention, there is provided a communication control method that is carried out by a wireless communication device capable of performing a communication with a wireless communication terminal by utilization of a coordinated multiple point transmission/reception technique and in coordination with another adjacent wireless communication device, the method comprising:

calculating traffic of a wireless communication device of interest;

transmitting and receiving information representing traffic of the wireless communication device of interest and traffic of the other wireless communication device; and, when the traffic of the other wireless communication device is higher than a predetermined value while the wireless communication device of interest remains connected to the wireless communication terminal in coordination with the other wireless communication device and by utilization of the coordinated multiple point transmission/reception technique, making a change to a parameter pertinent to a requirement such that an area over which the wireless communication terminal performs communication by utilization of the coordinated multiple point transmission/reception technique shrinks toward the other wireless communication device, and making a change such that, among resources allocated to the other wireless communication device, a resource used in a communication that does not utilize the coordinated multiple point transmission/reception technique becomes greater in proportion.

Advantage of the Invention

The wireless communication device and the communication control method of the invention enable lessening of load on a high traffic wireless communication device in accordance with a traffic status of each of wireless communication devices that can utilize a coordinated multiple point transmission/reception (CoMP) technique.

EMBODIMENTS FOR IMPLEMENTING THE INVENTION

Figure 1:
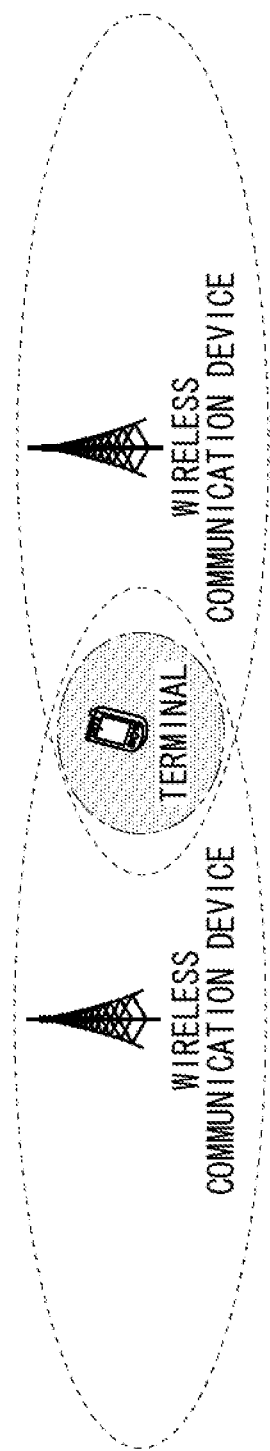
FIG. 1 is a drawing showing an example configuration of a wireless communication system.

Embodiments of a wireless communication system including a wireless communication base station of the invention are described in detail by reference to the drawings. FIG. 1 is a drawing showing an example configuration of the wireless communication system. As shown in FIG. 1, the wireless communication system of the embodiments to be described below is equipped with at least one wireless communication terminal and a plurality of wireless communication devices capable of performing a communication with the wireless communication terminal by way of a wireless communication network. In the following descriptions, the wireless communication terminal is simply called a "terminal." The terminal is; for instance, a portable cellular phone. Moreover, in the following descriptions, the wireless communication device is a device with which a terminal can perform a communication and which generically comprehends a wireless communication base station (E-UTRAN NodeB: eNB), a relay (Relay Node or a repeater), a femto base station, and a pica base station.

The wireless communication system utilizes an LTE or LTE-A mobile communication technique standardized by the 3GPP (The $3^{rd}$ Generation Partnership Project). In this respect, a mobile communication technique utilized by the wireless communication system is not confined to the above standards and may conform to a wireless LAN (Wireless Local Area Network), IEEE802.16, WiMAX (Worldwide interoperability for Microwave Access) such as IEEE802.16e or IEEE802.16m, 3GPP2, SAE (System Architecture Evolution), UMTS (Universal Mobile Telecommunications System), or the $4^{th}$ generation mobile communication scheme.

Each of the wireless communication devices makes up at least one communication cell. The communication cell refers to a wireless network object that the terminal can uniquely identify by means of an identifier allocated to a geographical area or a difference in frequency used in the geographical area. A communication cell is designated by a dotted line in FIG. 1.

The communication cell is referred to simply as a "cell" in the following descriptions. One wireless communication device makes up one or more cells for one or more carrier frequencies. The configuration is a fundamental concept, and the wireless communication device can also make up one cell in coordination with another wireless communication device. Further, the terminal carries out a communication by utilization of at least one of cells that the wireless communication devices make up.

Wireless communication systems of first and second embodiments are hereunder described in turn. In the first and second embodiments, the constituents that exhibit the same functions are assigned the same reference numerals, and their repeated explanations are omitted. The wireless communication systems which will be described in connection with the respective embodiments use a coordinated multiple point transmission/reception (CoMP: Coordinated Multiple Point transmission/reception) technique. The CoMP technique is one for enhancing terminal throughput by coordinated operation of a plurality of wireless communication devices. The plurality of wireless communications devices make up respective cells, and the terminal is connected to a cell (a cell of interest) made by one wireless communication device in a CoMP set (a group of wireless communication devices that operate for one terminal in a coordinated fashion). In this regard, the plurality of wireless communication devices can also make up one cell.

In the embodiments to be described below, a method for performing a CoMP communication among a plurality of independent wireless communication devices (a plurality of pieces of wireless base station equipment which each have a wireless resource management function) is presumed to be a method for substantializing the CoMP technique.

First Embodiment

Like the wireless communication system shown in FIG. 1, a wireless communication system of a first embodiment is made up of at least one terminal and two wireless communication devices. By means of a downlink, the terminal receives a reference signal transmitted from the wireless communication device on a per-cell basis, notifying the wireless communication devices about a measurement report (a measurement result) derived by a defined calculation formula. Each of the wireless communication devices allocates and manages a wireless resource (for instance, a frequency band in a frequency domain or a time domain) for each terminal, thus acting as an access point for the terminal in a wireless access network. Incidentally, the wireless resource is simply called a "resource" in the following descriptions.

Figure 2:
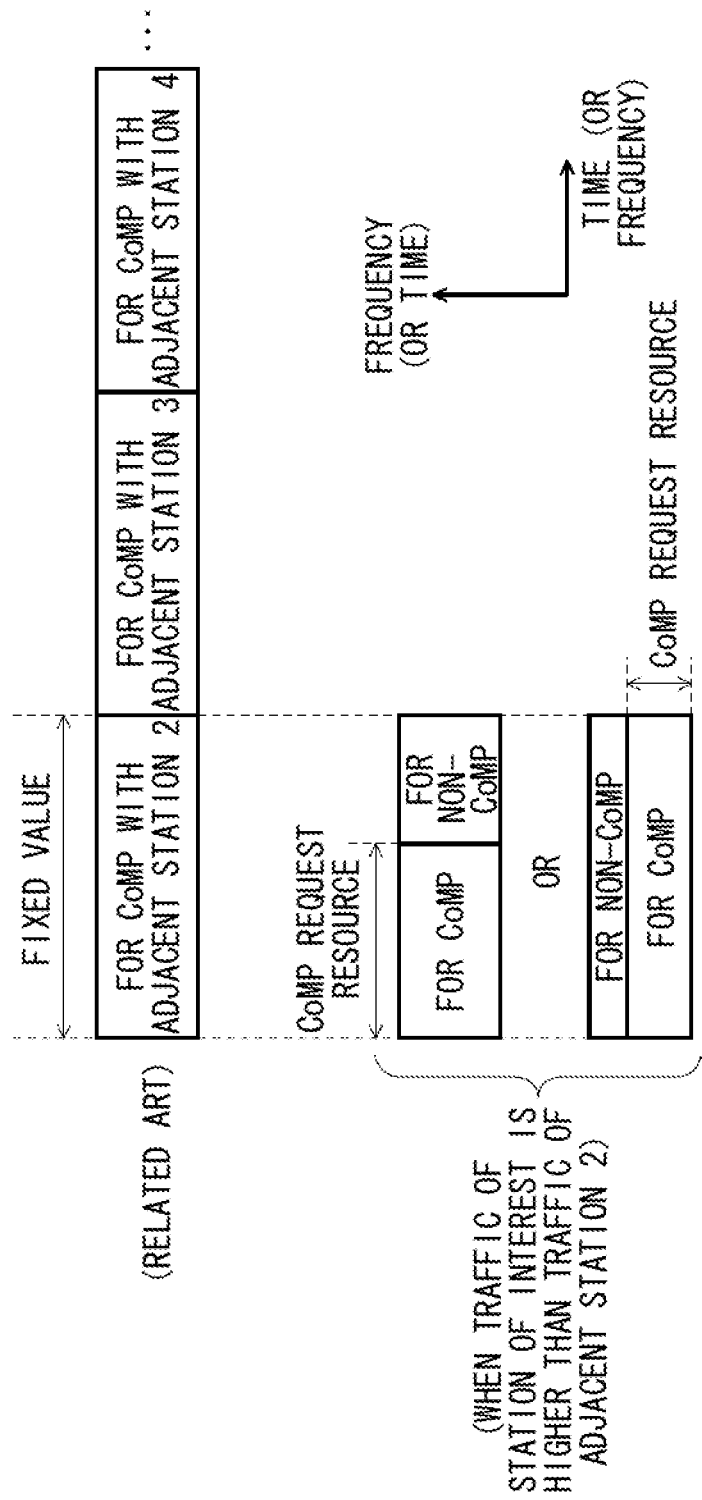
FIG. 2 is a drawing showing example setting of a resource for which a wireless communication device (a station of interest) that is in the course of performing a communication with a terminal makes a request to an adjacent station 2 when traffic of the station of interest is higher than traffic of the adjacent station 2.

FIG. 2 is a drawing showing example setting of a resource for which a wireless communication device that is in the course of performing communication with the terminal (a station of interest) makes a request to an adjacent station 2 when traffic of the station of interest is higher than traffic of the adjacent station 2. In the first embodiment, when the traffic of the wireless communication device (hereinafter called a "station of interest") to which the terminal is connected is higher than traffic of a wireless communication device (hereinafter called an "adjacent station") adjacent to the station of interest, a proportion of CoMP resource for which the station of interest makes a request to the adjacent station 2 is increased as illustrated in FIG. 2. As a result, the station of interest can cover many CoMP terminals.

Incidentally, a terminal that performs communications with a plurality of wireless communication devices by use of the CoMP technique is called a "CoMP terminal." Further, a terminal that performs a communication with one wireless communication device without use of the CoMP technique is called a "non-CoMP terminal." A way to divide a CoMP terminal resource from a non-CoMP terminal resource may be put into practice by use of an axis differing from axes which are used for distinguishing resources of adjacent stations from each other or by use of a frequency hopping pattern.

Moreover, in the embodiment, when the traffic of the station of interest is higher than the traffic of the adjacent station, a non-CoMP terminal located in the vicinity of a cell edge that is subordinate to the station of interest and that belongs to an adjacent station is caused to perform a CoMP communication, whereby the traffic of the station of interest is lessened. In this regard, "causing the non-CoMP terminal to perform a CoMP communication" means the shift of the non-CoMP terminal connected to the station of interest to a communication mode that uses a CoMP technique by means of which the non-CoMP terminal is connected to an adjacent station as well as to the station of interest.

In order to shift the non-CoMP terminal that is subordinate to the cell of interest and located in the vicinity of the cell edge of the adjacent station to a CoMP communication, the station of interest of the embodiment sets a negative offset on a threshold value for an event requirement in "Measurement Configuration (measurement setting)" to be reported to the non-CoMP terminal. The threshold value included in the event requirement is determined depending on whether or not terminal throughput is enhanced by the CoMP communication. The event requirement on which the negative offset is set is represented by Expression (1) provided below.

(Receiving quality of an adjacent station)>(Receiving quality of a station of interest)+a threshold value+a negative offset    (1)

Upon satisfying the event requirement, the non-CoMP terminal transmits "Measurement Report" to the station of interest. The station of interest received the Measurement Report makes a CoMP request to the adjacent station.

Figure 3:
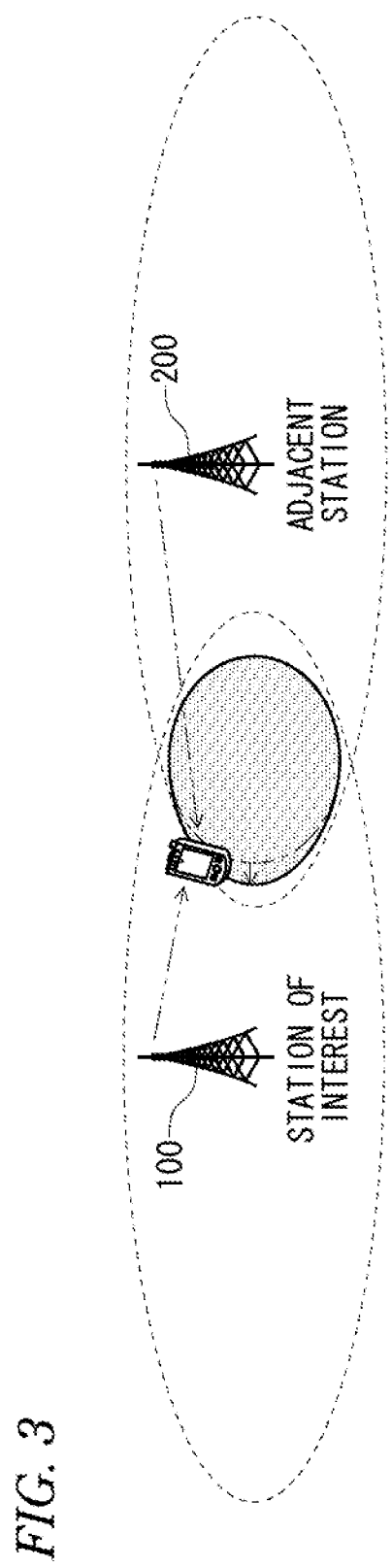
FIG. 3 is a conceptual rendering showing an extension of a CoMP area, which is subordinate to the station of interest and which belongs to an adjacent station, in the wireless communication system of the first embodiment.

As mentioned above, a CoMP area that is subordinate to the station of interest and that belongs to the adjacent station becomes broader toward the station of interest as a result of the negative offset being set on the threshold value of the event requirement. FIG. 3 is a conceptual rendering showing extension of the CoMP area that is subordinate to the station of interest and that belongs to the adjacent station in the wireless communication system of the first embodiment. The area CoMP achieved before the negative offset is set on the event requirement corresponds to a range denoted by alternate long and short dashed lines in FIG. 1 and FIG. 3. As a value of a right side of the event requirement represented by Expression (1) becomes smaller, a possibility that the non-CoMP terminal will be caused to perform CoMP communication becomes greater even when receiving quality of the non-CoMP terminal with regard to the adjacent station becomes worse. To be specific, even when the non-CoMP terminal has come closer to the cell edge of the adjacent station, the possibility of the non-CoMP terminal being caused to perform CoMP communication increases. As a result, as denoted by a solid line in FIG. 3, an area where the non-CoMP terminal is caused to perform CoMP communication extends toward the station of interest.

Figure 4:
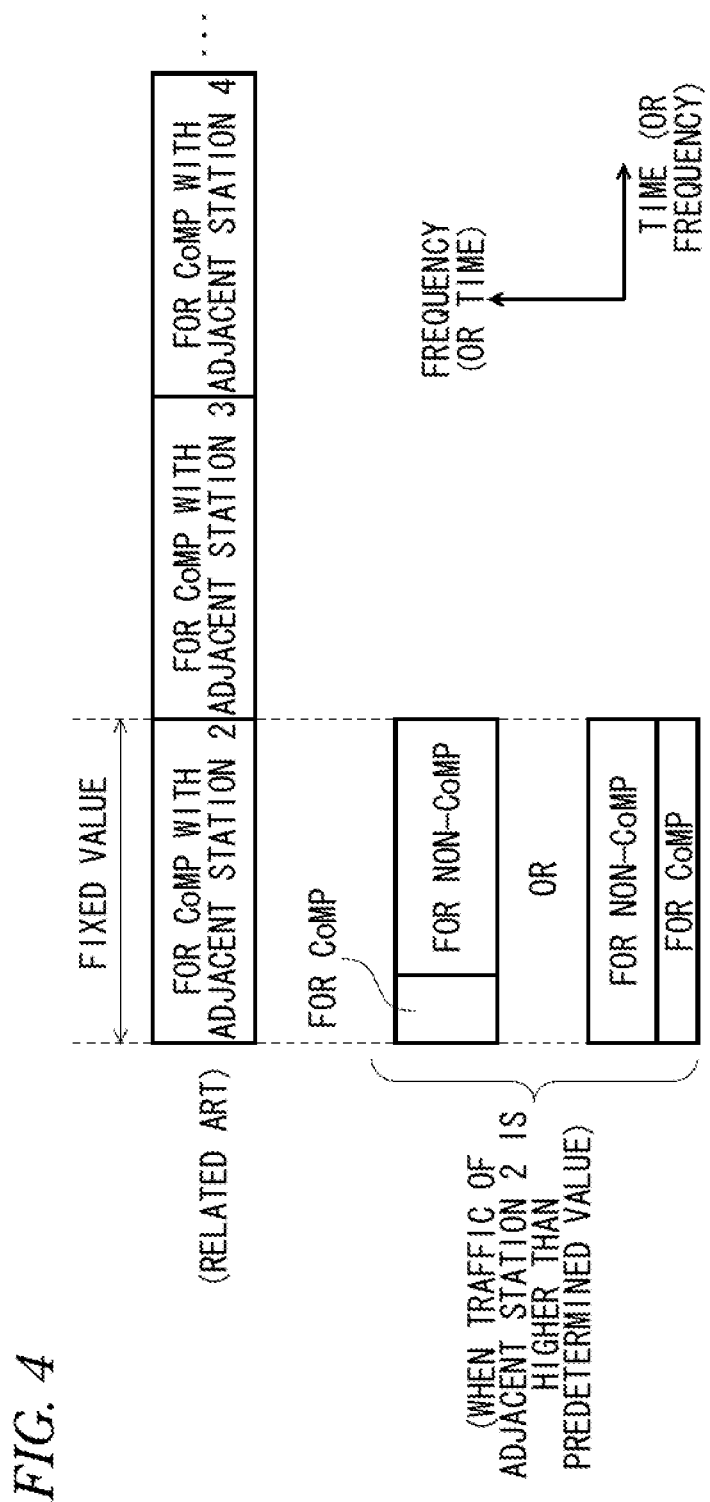
FIG. 4 is a drawing showing example setting of a resource for which a master base station makes a request to the adjacent station 2, or a slave base station, when traffic of the adjacent station 2 of two wireless communication devices that are in the course of performing communication with a terminal by utilization of a CoMP technique is higher than a predetermined value.

FIG. 4 is a drawing showing example setting of a resource for which a master base station makes a request to the adjacent station 2 when traffic of the adjacent station 2, which is a slave base station, of two wireless communication devices that are in the course of performing a communication with a terminal by utilization of a CoMP technique is higher than a predetermined value. In the first embodiment, when the traffic of the slave base station in the course of performing CoMP communication is higher than a predetermined value, a proportion of the CoMP resource for which the master base station makes a request to the slave base station is reduced. As a result, the station of interest that is the master base station can cover many non-CoMP terminals.

Moreover, in the embodiment, when the traffic of the slave base station is higher than the predetermined value, a CoMP terminal that is subordinate to the cell of the master base station and that belongs to the cell edge of the slave base station is brought into a mono-station link to the master base station, whereby the traffic of the slave base station is lessened. In this respect, bringing the CoMP terminal into a mono-station link to the master base station namely corresponds to cancellation of the CoMP communication.

In order to cancel the CoMP communication of the CoMP terminal that is subordinate to the cell of the master base station and that belongs to the cell edge of the slave base station, the master base station of the embodiment sets a negative offset on the threshold value of the event requirement in "Measurement Configuration" to be reported to the CoMP terminal. In this regard, the negative offset varies from one slave base station to another. The threshold value included in the event requirement is determined on the basis of whether or not the terminal throughput is enhanced by the CoMP communication. The event requirement on which the negative individual offset is set is represented by Expression (2) provided below.

(Receiving quality of the master base station)>(Receiving quality of the slave base station)+a threshold value+a negative individual offset    (2)

When the event requirement is fulfilled by the CoMP terminal, the CoMP terminal transmits the "Measurement Report" to the master base station. The master base station received the Measurement Report releases the CoMP terminal from the CoMP communication with the slave base station, changing the CoMP terminal to a mono-station link to the station of interest.

Figure 5:
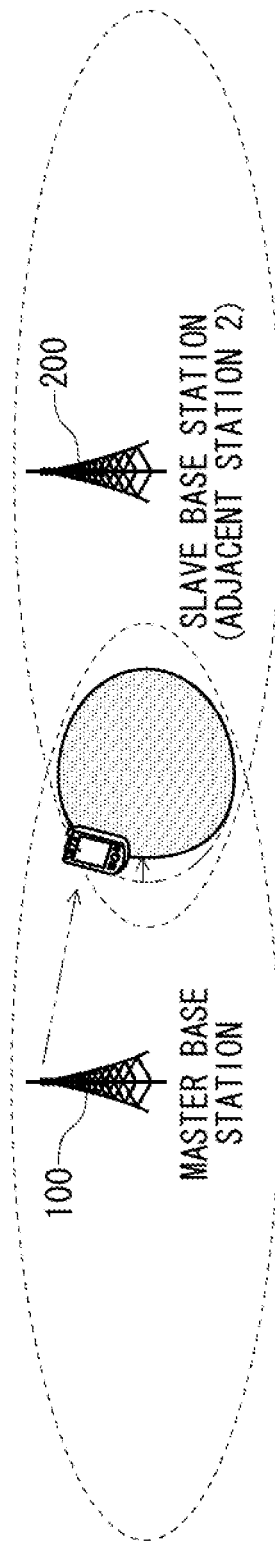
FIG. 5 is a conceptual rendering showing shrinkage of a CoMP area, which is subordinate to a cell of the master base station and which belongs to a slave base station, in the wireless communication system of the first embodiment.

As described above, as a result of the negative individual offset being set on the event requirement, the CoMP area which is subordinate to the cell of the master base station and which belongs to the slave base station shrinks toward the slave base station. FIG. 5 is a conceptual rendering showing shrinkage of the CoMP area which is subordinate to a cell of the master base station and which belongs to a slave base station in the wireless communication system of the first embodiment. The CoMP area achieved before the negative individual offset is set on the event requirement corresponds to a range denoted by alternate long and short dashed lines in FIG. 1 and FIG. 5. As a value of a right side of the event requirement represented by Expression (2) becomes smaller, there is a greater possibility that the CoMP terminal will cancel the CoMP communication and shift to the mono-station link to the master base station when the receiving quality of the CoMP terminal in connection with the master base station becomes worse. As a result, the area where the CoMP communication of the CoMP terminal is maintained shrinks toward the slave base station as denoted by a solid line shown in FIG. 3.

Each of the base stations calculates traffic of a terminal capable of performing a CoMP communication with the base station of interest from the number of terminals satisfying the following two requirements, among terminals that are subordinate to a cell of the base station of interest; that are present in the vicinity of a cell edge of another base station which performs coordinated communication with the base station of interest; and that have a CoMP function. One requirement exhibits a high QoS for a bearer that the terminal has established with respect to a network. In other words, a value of a QCI (QoS Class Identifier) falls below a threshold value (e.g., five). In this respect, the QCI is any of integers from one to nine, and QCIs that range from one to four are equal to a GBR (Guaranteed Bit Rate), and QCIs that range from five to nine are equal to a Non-GBR. Another requirement is that a difference between the receiving quality of the base station of interest and the receiving quality of another base station which performs coordinated communication with the base station of interest is equal to or less than a threshold value. This is a requirement for a terminal capable of performing a CoMP communication. Each of the base stations calculates the number of terminals that satisfy the two requirements and that have a CoMP function, and the traffic of the base station of interest is determined to be higher as the number of terminals is larger.

In order to take into account information about traffic of another base station that performs coordinated communication with the base station of interest, each of the base stations exchanges in advance traffic information with base stations located around the base station of interest. The traffic information about the base stations located around each of the base stations is updated by periodically exchanging the traffic information with the surrounding base stations.

Figure 6:
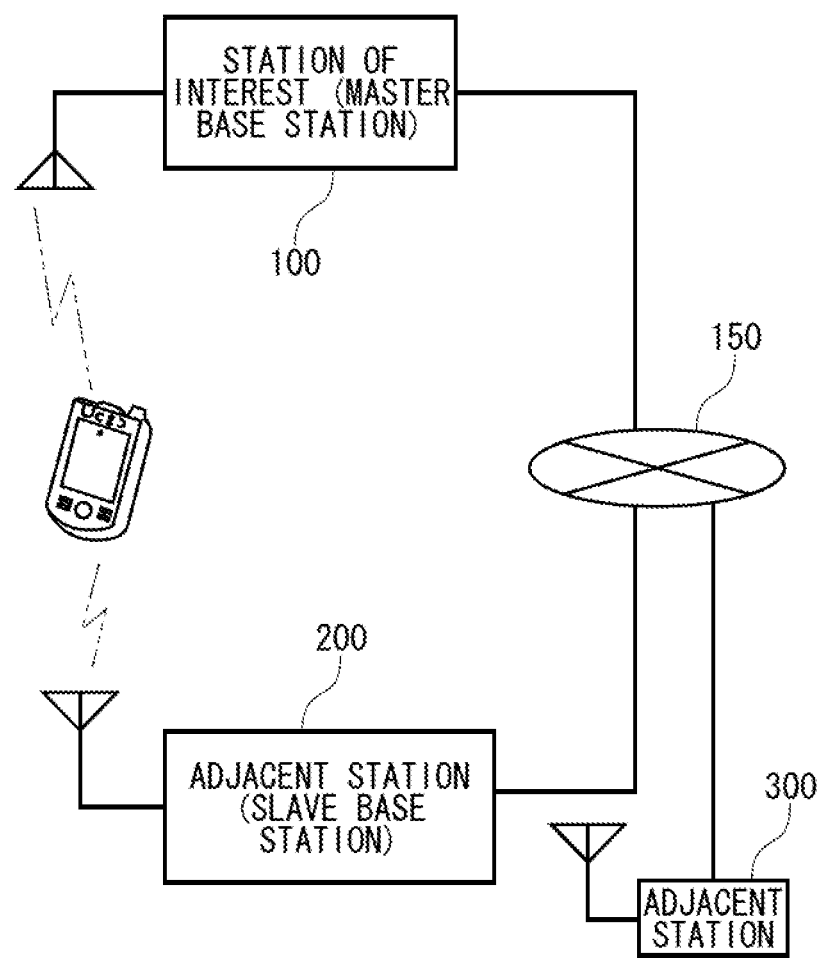
FIG. 6 is a block showing a configuration of the wireless communication system of the first embodiment shown in FIG. 1.

FIG. 6 is a block diagram showing a configuration of the wireless communication system of the first embodiment shown in FIG. 1. As shown in FIG. 6, the station of interest (the master base station) 100 and the adjacent station (the slave base station) 200 are connected to each other by way of a network 150 made up of a cable. Another base station 300 adjoining to the adjacent station 200 can also be connected to the network 150.

Figure 7:
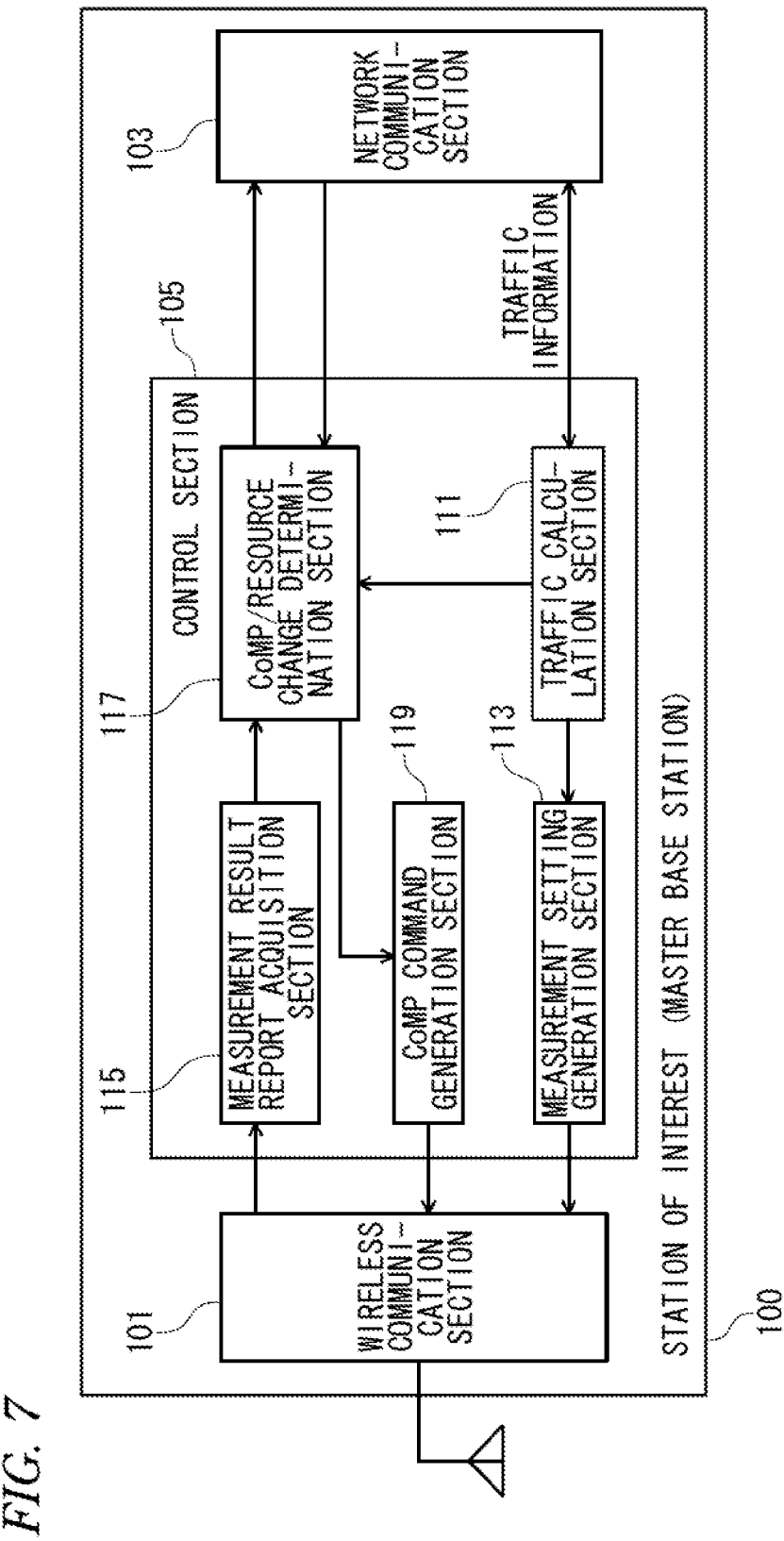
FIG. 7 is a block diagram showing an internal configuration of a station of interest (a master base station) that makes up the wireless communication system of the first embodiment shown in FIG. 1.

The station of interest 100 is hereunder described. FIG. 7 is a block diagram showing an internal configuration of a base station of interest (a master base station) that makes up the wireless communication system of the first embodiment shown in FIG. 1. As shown in FIG. 7, the station of interest 100 has a wireless communication section 101, a network communication section 103, and a control section 105. The control section 105 has a traffic calculation section 111, a measurement setting generation section 113, a measurement result report acquisition section 115, a CoMP/resource change determination section 117, and a CoMP command generation section 119.

The wireless communication section 101 receives control information and uplink data that are transmitted from the terminal, outputting the thus-received data to the control section 105. The wireless communication section 101 transmits to the terminal a Measurement Configuration (measurement settings) or a CoMP command input from the control section 105.

The network communication section 103 transmits the information input from the control section 105 to the adjacent station 200. The network communication section 103 receives the information transmitted from the adjacent station 200, outputting the information to the control section 105. The information that is transmitted to and received from the adjacent station 200 by way of the network communication section 103 is for instance, information representing traffic of the station of interest 100 and information representing traffic of the adjacent station 200.

When the traffic of the station of interest 100 is higher than the traffic of the adjacent station while the station of interest remains in connection with the terminal (the non-CoMP terminal) without utilization of the CoMP technique, the control section 105 performs processing such that the Measurement Configuration including the event requirement in which the negative offset is set on the threshold value is reported to the non-CoMP terminal. When the traffic of the adjacent station 200 is higher than a predetermined value while the station of interest remains in connection with the terminal (the CoMP terminal) in coordination with the adjacent station 200 by utilization of the CoMP technique, the control section 105 performs processing such that the Measurement Configuration including the event requirement in which the negative individual offset is set on the threshold value is reported to the CoMP terminal.

Respective constituents that make up the control section 105 are hereunder described.

The traffic calculation section 111 calculates the traffic of the station of interest 100 from the number of terminals satisfying both two requirements, among terminals that are subordinate to the cell of the station of interest 100 and present in the vicinity of the cell edge of the adjacent station 200 and that have a CoMP function. The two requirements mean that the value of the QCI falls below the threshold value and that a difference between the receiving quality of the station of interest 100 and the receiving quality of the adjacent station 200 falls within the threshold value.

The measurement setting generation section 113 generates the Measurement Configuration (measurement settings) that includes the event requirement which will serve as a trigger for causing the terminal to report a method for measuring receiving quality with regard to the respective base stations and the Measurement Report (the measurement results) to the station of interest 100. The Measurement Configuration generated by the measurement setting generation section 113 is delivered to the wireless communication section 101 and further transmitted to the terminal from the wireless communication section 101.

The measurement result report acquisition section 115 acquires the Measurement Report (measurement results) that has been transmitted from the terminal and received by the wireless communication section 101.

A CoMP/resource change determination section 117 determines initiation or abortion of CoMP communication in accordance with the Measurement Report. In addition, in accordance with the traffic of the station of interest 100 and the traffic of the adjacent station 200, the CoMP/resource change determination section 117 determines a change of a resource to be used in the CoMP communication and details of the change. Specifically, the CoMP/resource change determination section 117 changes, for each adjacent station, a proportion between the resource used in a communication utilizing the CoMP technique and the resource used in a communication which does not utilize the CoMP technique.

A request (a CoMP initiation request, a CoMP termination request, or a CoMP resource change request) based on details of a determination made by the CoMP/resource change determination section 117 is delivered to the network communication section 103, and the request is transmitted from the network communication section 103 to the adjacent station 200 by way of the network 150. In this respect, the CoMP initiation request includes information about a CoMP resource for which a request is made to the adjacent station 200. Further, the CoMP resource change request includes information about a changed CoMP resource.

The CoMP command generation section 119 generates a CoMP command that accords with contents determined by the CoMP/resource change determination section 117. The CoMP command generated by the CoMP command generation section 119 is delivered to the wireless communication section 101 and further to the terminal from the wireless communication section 101.

Figure 8:
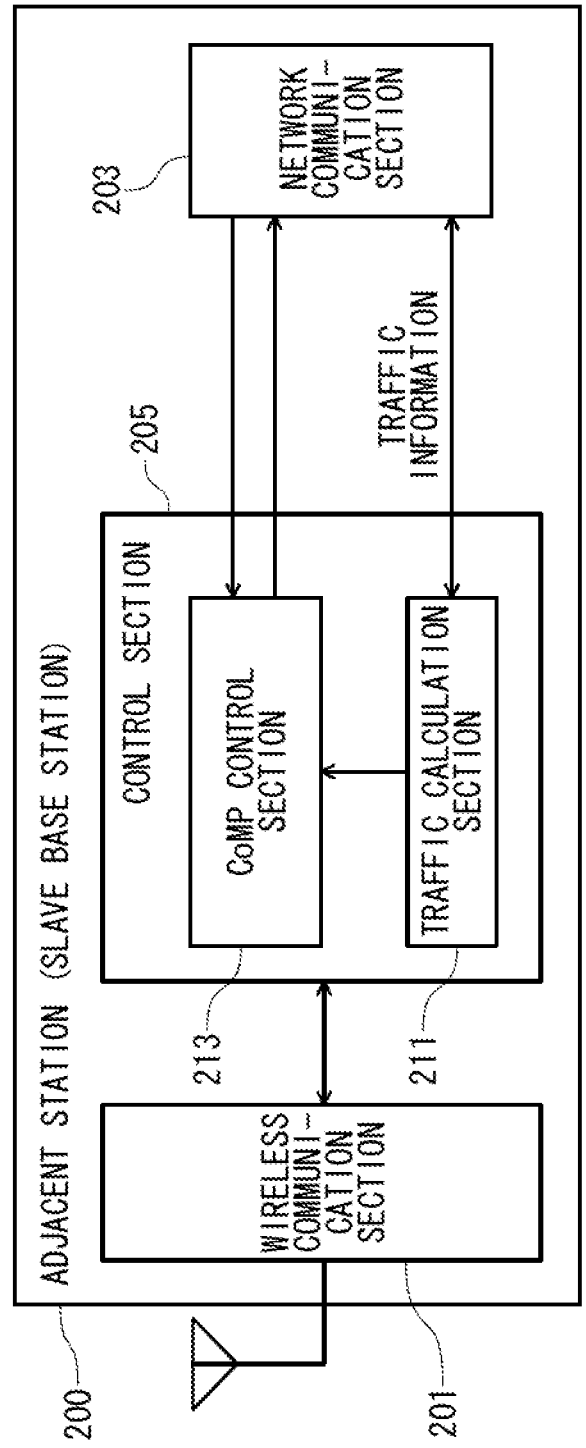
FIG. 8 is a block diagram showing an internal configuration of an adjacent station (a slave base station) that makes up the wireless communication system of the first embodiment shown in FIG. 1.

The adjacent station 200 is now described. FIG. 8 is a block diagram showing an internal configuration of an adjacent station (a slave base station) that makes up the wireless communication system of the first embodiment shown in FIG. 1. As shown in FIG. 8, the adjacent station 200 has a wireless communication section 201, a network communication section 203, and a control section 205. The control section 205 has a traffic calculation section 211 and a CoMP control section 213.

The wireless communication section 201 receives the control information and the uplink data that are transmitted from the terminal, outputting the information and the data to the control section 205. The wireless communication section 201 also transmits the information input from the control section 205 to the terminal.

The network communication section 203 transmits the information input from the control section 205 to the station of interest 100. The network communication section 203 also receives a request transmitted from the station of interest 100 or a request transmitted from the other base station 300 shown in FIG. 6, outputting the thus-received request to the control section 205. The information transmitted to or received from the station of interest 100 or the other base station 300 by way of the network communication section 203 is; for instance, one that represents traffic of each of the base stations.

The control section 205 performs processing conforming to the request (a CoMP initiation request, a CoMP termination request, and a CoMP resource change request) transmitted from the station of interest 100 by way of the network 150. Constituents that make up the control section 205 will be described hereunder.

Like the traffic calculation section 111 of the station of interest 100, the traffic calculation section 211 calculates traffic of the adjacent station 200 from the number of terminals satisfying both two requirements, among terminals that are subordinate to the cell of the adjacent station 200; that are present in the vicinity of the cell edge of the station of interest 100 or the other base station 300; and that have a CoMP function. The two requirements mean that the value of the QCI is smaller than the threshold value and that a difference between the receiving quality of the station of interest 100 and the receiving quality of the adjacent station 200 or a difference between the receiving quality of the adjacent station 200 and the receiving quality of the other base station 300 falls within the threshold value.

When the station of interest 100 makes a CoMP initiation request, there is allowed use of a resource which the terminal would use when establishing a communication with the station of interest 100 and the adjacent station 200 by use of the CoMP technique, in accordance with information about the CoMP resource included in the CoMP initiation request. When the station of interest 100 makes a CoMP termination request, the CoMP control section 213 performs processing for terminating the CoMP communication with the station of interest 100. In addition, when the station of interest 100 makes a CoMP resource change request, the CoMP control section 213 allows use of the resource to be used for the CoMP communication with the station of interest 100, in accordance with changed CoMP resource information included in the CoMP resource change request. The CoMP control section 213 transmits to the network communication section 203 a response that represents details of processing that has been performed in response to each of the requests.

Figure 9:
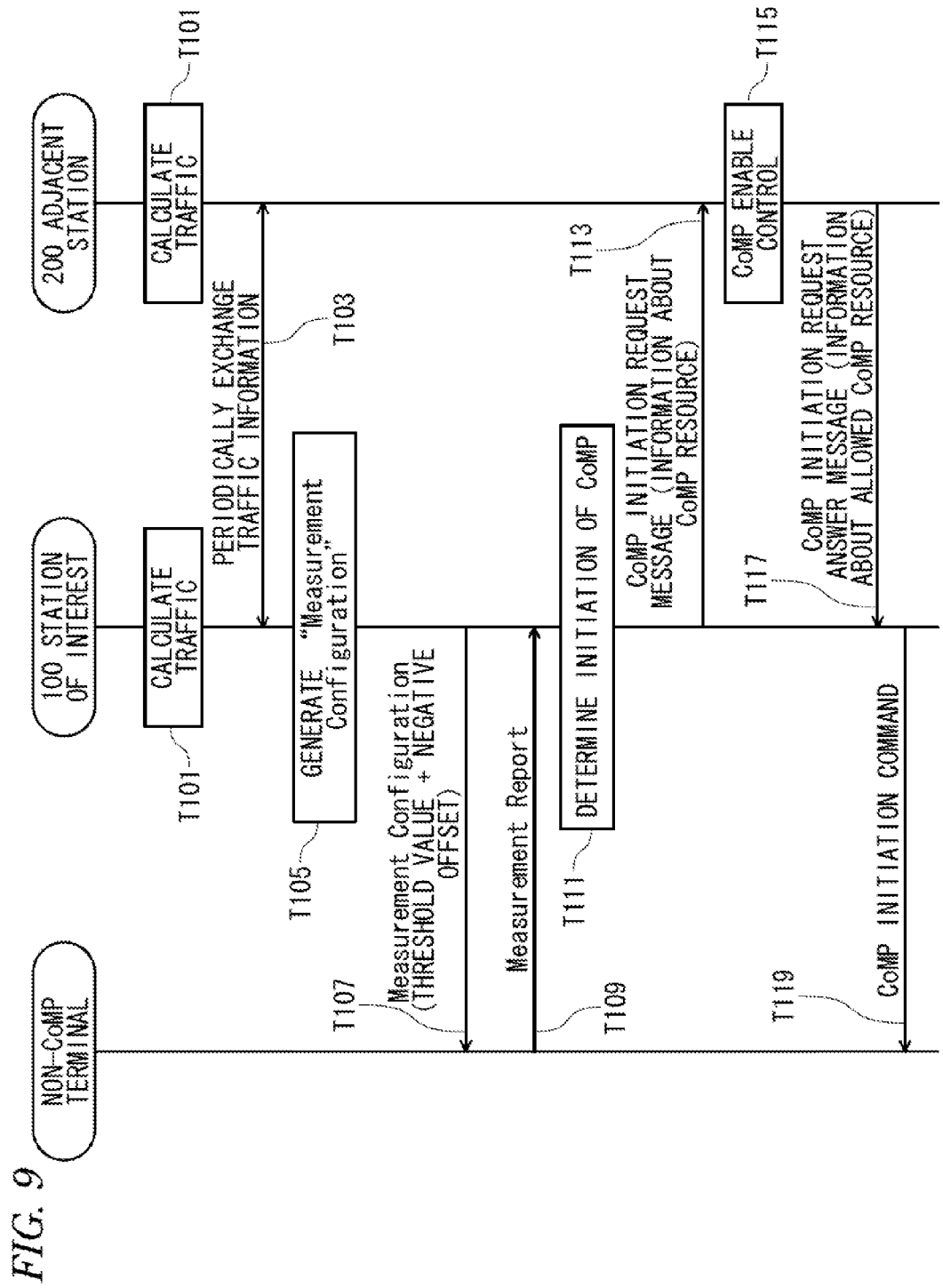
FIG. 9 is a timing chart employed in the wireless communication system of the first embodiment when a non-CoMP terminal is caused to perform a CoMP communication because traffic of the station of interest is higher than traffic of the adjacent station.

In the wireless communication system of the embodiment shown in FIG. 3, the traffic of the station of interest 100 is higher than the traffic of the adjacent station 200. Hence, operation to be performed when the non-CoMP terminal staying in connection with the station of interest 100 is caused to perform a CoMP communication is described by reference to FIG. 9. FIG. 9 is a timing chart employed in connection with the wireless communication system of the first embodiment when a non-CoMP terminal is caused to perform a CoMP communication because traffic of the station of interest is higher than traffic of the adjacent station.

As shown in FIG. 9, the station of interest 100 and the adjacent station 200 each calculates traffic (T101), periodically exchanging traffic information (T103). In this state, when the station of interest 100 determines that the traffic of the station of interest 100 is higher than the traffic of the adjacent station 200, the station of interest 100 generates a Measurement Configuration including the event requirement represented by Expression (1); namely, "(receiving quality of the adjacent station 200)>(receiving quality of the station of interest 100)+a threshold value+negative offset)" (T105), transmitting the Measurement Configuration to the non-CoMP terminal (T107). When determining that the event requirement of the Measurement Configuration is fulfilled, the non-CoMP terminal generates a Measurement Report, transmitting it to the station of interest 100 (T109).

In accordance with the Measurement Report transmitted from the non-CoMP terminal, the station of interest 100 determines to initiate a CoMP communication that will be carried out by coordination of the station of interest 100 with the adjacent station 200 (T111). The station of interest 100 that has made the determination transmits a CoMP initiation request message to the adjacent station 200 (T113). In this respect, the CoMP initiation request message includes information about a CoMP resource for which a request is made to the adjacent station 200. At this time, the CoMP resource requested is determined according to traffic as shown in FIG. 2.

The adjacent station 200 received the CoMP initiation request message allows use of the resource utilized by the CoMP communication with the station of interest 100 (T115), transmitting a CoMP initiation request answer message to the station of interest 100 (T117). In this respect, the CoMP initiation request answer message includes information about the CoMP resource allowed by the adjacent station 200. The station of interest 100 transmits to the non-CoMP terminal a CoMP initiation command that includes CoMP resource information about the station of interest 100 and CoMP resource information about the adjacent station 200.

Figure 10:
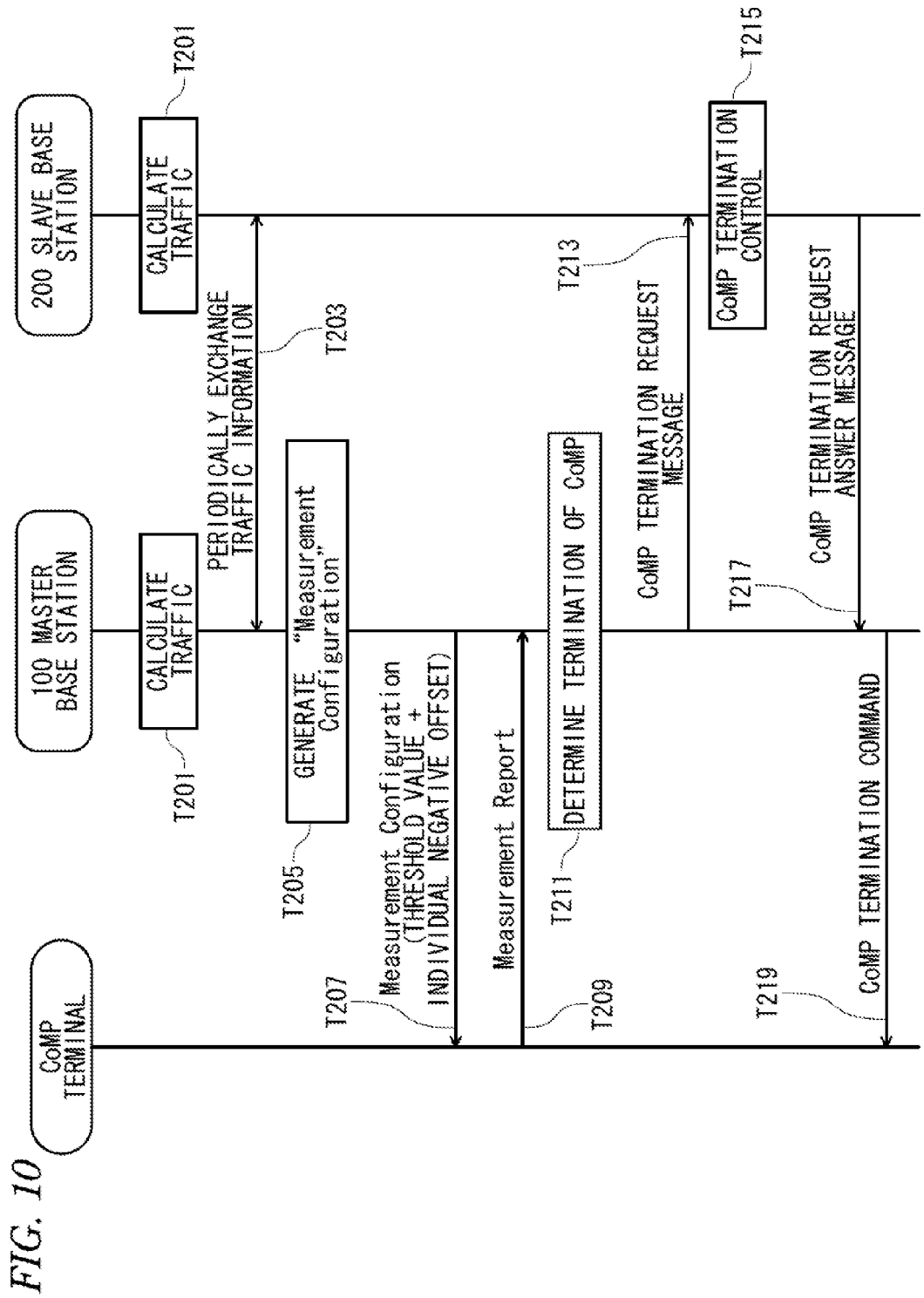
FIG. 10 is a timing chart employed in the wireless communication system of the first embodiment when a CoMP terminal is brought into a mono-station link to the master base station because the traffic of the slave base station is higher than a predetermined value.

Next, in the wireless communication system of the embodiment shown in FIG. 5, an explanation is now given, by reference to FIG. 10 to operation that will be carried out when the CoMP terminal which remains in connection with the master base station 100 and the slave base station 200 is brought into a mono-station link to the master base station 100 because the traffic of the slave base station 20 is higher than a predetermined value. FIG. 10 is a timing chart used for the wireless communication system of the first embodiment when the CoMP terminal is brought into a mono-station link to the master base station because the traffic of the slave base station is higher than a predetermined value.

As shown in FIG. 10, the master base station 100 and the slave base station 200 each calculates traffic (T201), periodically exchanging traffic (T203). In this state, when the master base station 100 determines that the traffic of the slave base station 200 is higher than the predetermined value, the master base station 100 generates a Measurement Configuration including the event requirement represented by Expression (2); namely, "(receiving quality of the master base station 100)>(receiving quality of the slave base station 200)+a threshold value+negative offset)" (T205), transmitting the Measurement Configuration to the CoMP terminal (1207). When determining that the event requirement of the Measurement Configuration is fulfilled, the CoMP terminal generates a Measurement Report, transmitting it to the station of interest 100 (T209).

In accordance with the Measurement Report transmitted from the CoMP terminal, the master station 100 determines to terminate CoMP communication with the slave base station 200 (T211). The master base station 100 that has made the determination transmits a CoMP termination request message to the slave base station 200 (T213). The slave base station 200 received the CoMP termination request message allows termination of the CoMP communication (T215), transmitting a CoMP termination request answer message to the master base station 100 (T217). The master base station 100 transmits the CoMP termination command to the CoMP terminal (T219).

Figure 11:
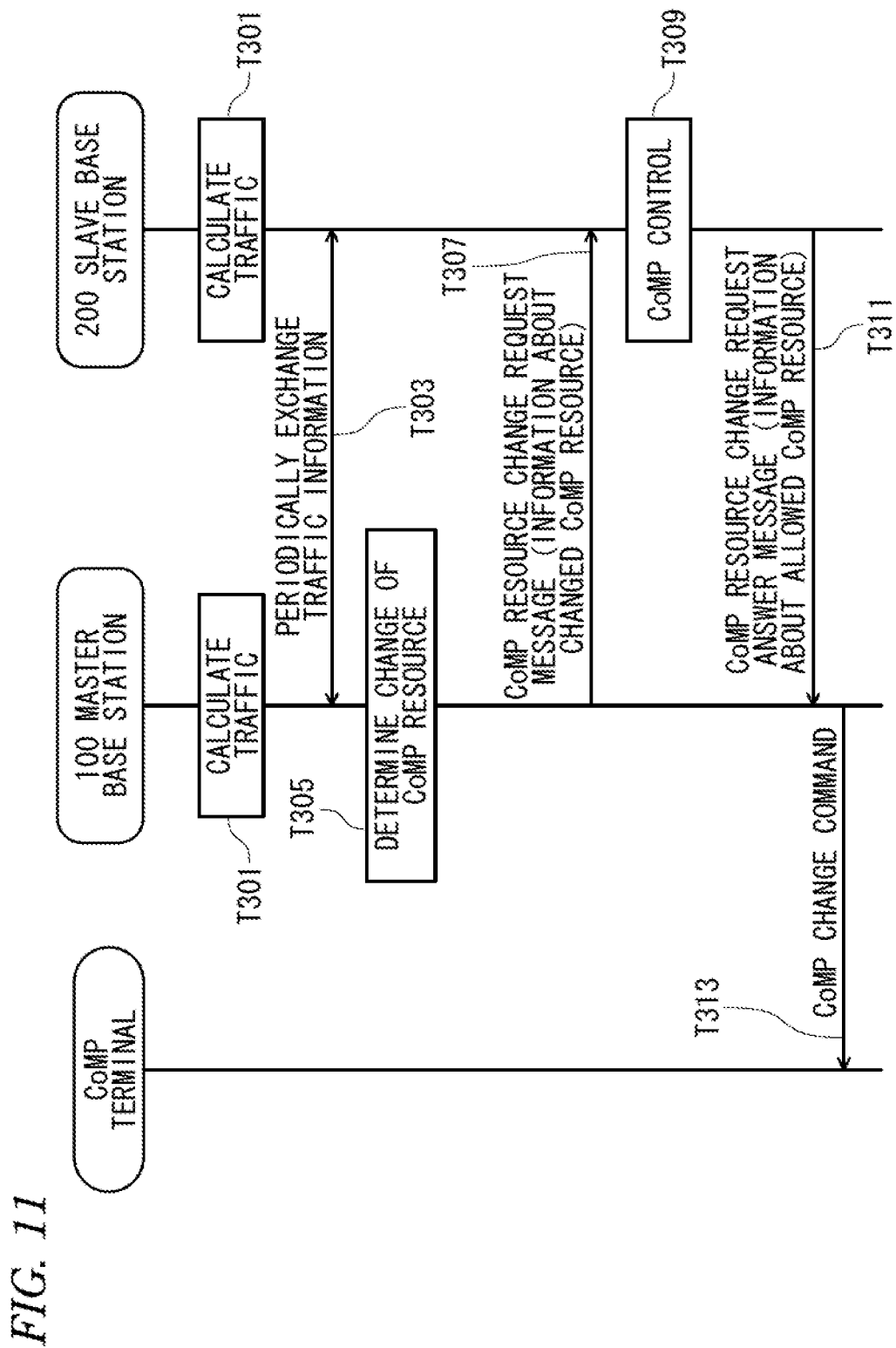
FIG. 11 is a timing chart employed in the wireless communication system of the first embodiment when a change is made to a CoMP resource provided by a slave base station 200.

By reference to FIG. 11, an explanation is given to operation of the wireless communication system of the embodiment shown in FIG. 1 to be performed when a change is made to the CoMP resource provided by the slave base station 200 which is in the course of performing the CoMP communication with the master base station 100.

As shown in FIG. 11, the master base station 100 and the slave base station 200 each calculates traffic (T301), periodically exchanging traffic (T303). In this state, when the master base station 100 determines to change the CoMP resource provided by the slave base station 200 (T305), the master base station 100 transmits a CoMP resource change request message to the slave base station 200 (T307). In this regard, the CoMP resource change request message includes information about changed CoMP resource for which a request is made to the adjacent station 200.

The slave base station 200 received the CoMP resource change request message allows changing of the CoMP resource (T309), transmitting a CoMP resource change request answer message to the master base station 100 (T311). In this respect, the CoMP resource change request answer message includes information about the changed CoMP resource allowed by the slave base station 200. The master base station 100 transmits to the CoMP terminal a CoMP change command including the changed CoMP resource in the slave base station 200 (T313).

As described above, the wireless communication system of the embodiment sets a negative offset on a threshold value included in the event requirement of the Measurement Configuration according to a traffic status of each of mutually adjacent base stations, whereby there is increased a possibility that a terminal which is subordinate to the station of interest and located in the vicinity of a cell edge of the adjacent station or the slave base station will transmit the Measurement Report. The base station received the Measurement Report from the terminal flexibly changes a proportion of the CoMP resource and the non-CoMP resource for which a request is made to the adjacent station or the slave station, in accordance with a traffic status of each of the base stations, thereby shifting the non-CoMP terminal to a CoMP terminal, or vice versa. As a consequence, load on a high traffic base station can be lessened.

In this regard, in the present embodiment, when the traffic of the master base station is higher than the traffic of the slave base station, the traffic of the master base station can also be lessened by bringing the CoMP terminal situated in the vicinity of the cell edge of the master base station into a mono-station link to the slave base station. In this case, the master base station cancels the CoMP communication with the CoMP terminal that is located in the vicinity of the cell edge of the master base station; hence, an individual negative offset is set on a threshold value in the event requirement of the "Measurement Configuration" to be reported to the CoMP terminal. In this respect, the individual negative offset varies from one slave base station to another. The event requirement on which the individual negative offset is set is represented by Expression (3) provided below.

$$\text{(Receiving quality of the slave base station)>(receiving quality of the master base station)+a threshold value+an individual negative offset} \quad (3)$$

When the CoMP terminal satisfies the event requirement, the CoMP terminal transmits the "Measurement Report" to the master base station. The master base station received the "Measurement Report" cancels the CoMP communication with the slave base station, performing handover processing with the base station that has worked as the slave base station.

Figure 12:
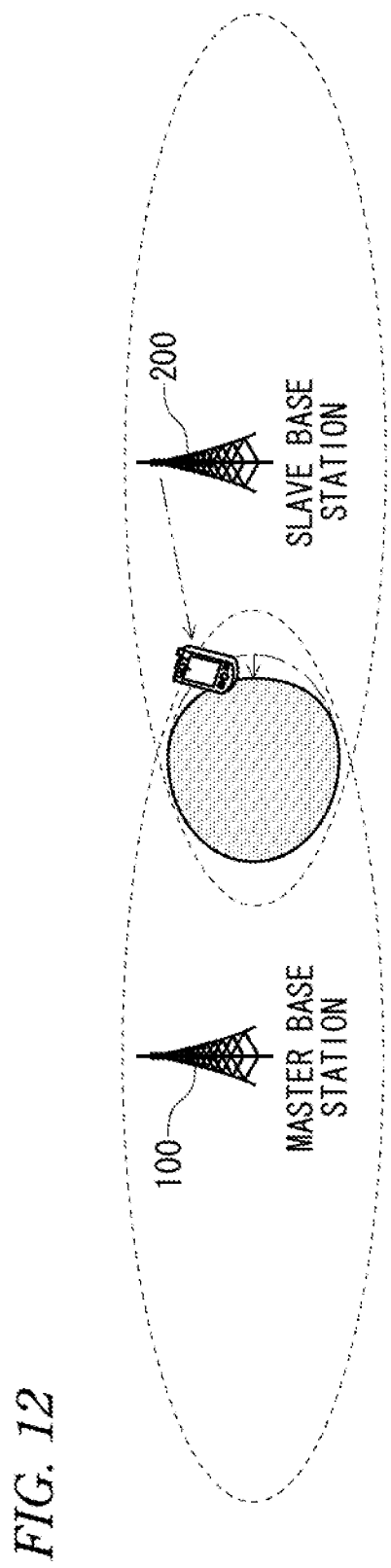
FIG. 12 is a conceptual rendering showing shrinkage of the CoMP area, which is subordinate to the cell of the master base station and which belongs to the slave base station, in the wireless communication system of the first embodiment.

As described above, as a result of the individual negative offset being set on the threshold value of the event requirement, the CoMP area that is subordinate to the cell of the master base station and that belongs to the slave base station shrinks toward the master base station. FIG. 12 is a conceptual rendering showing shrinkage of the CoMP area that is subordinate to the cell of the master base station and that belongs to the slave base station in the wireless communication system of the first embodiment. The CoMP area achieved before the individual negative offset is set on the event requirement corresponds to a range denoted by alternate long and short dashed lines in FIG. 1 and FIG. 12. As a value of a right side of the event requirement represented by Expression (3) becomes smaller, a possibility that the CoMP terminal will cancel CoMP communication and shift to a mono-station link to the slave base station becomes greater. As a result, as denoted by a solid line in FIG. 12, a range where the CoMP maintains the CoMP communication shrinks toward the master base station.

As above, when the traffic of the master base station is higher than the traffic of the slave base station, the CoMP terminal located in the vicinity of the cell edge of the master base station is brought into a mono-station link to the slave base station, thereby lessening the load on the high traffic master base station.

Second Embodiment

In a second embodiment, a base station that is to act as a slave base station and perform operation in coordination determines a resource that is used for allowing a CoMP communication, with regard to a CoMP resource requested by a base station that is to act as a master base station. In relation to a criterion employed this time, a consideration is given to traffic information about the base station that acts in coordination and a status of a CoMP resource requested by a station adjacent to the base station. For instance, when another base station has already sent a request for a CoMP resource to the base station that is to act in coordination, the base station that is to act in coordination determines an amount of resource allowed for CoMP purpose in accordance with a traffic status of each of the base stations rather than allowing use of the request CoMP resource without modifications, in order to avoid occurrence of a deficiency in a non-CoMP resource in the base station that is to act in coordination. The base station that is to act in coordination sends a CoMP request answer message, which includes information about a resource for allowing a CoMP communication, to the base station that has requested the CoMP.

Figure 13:
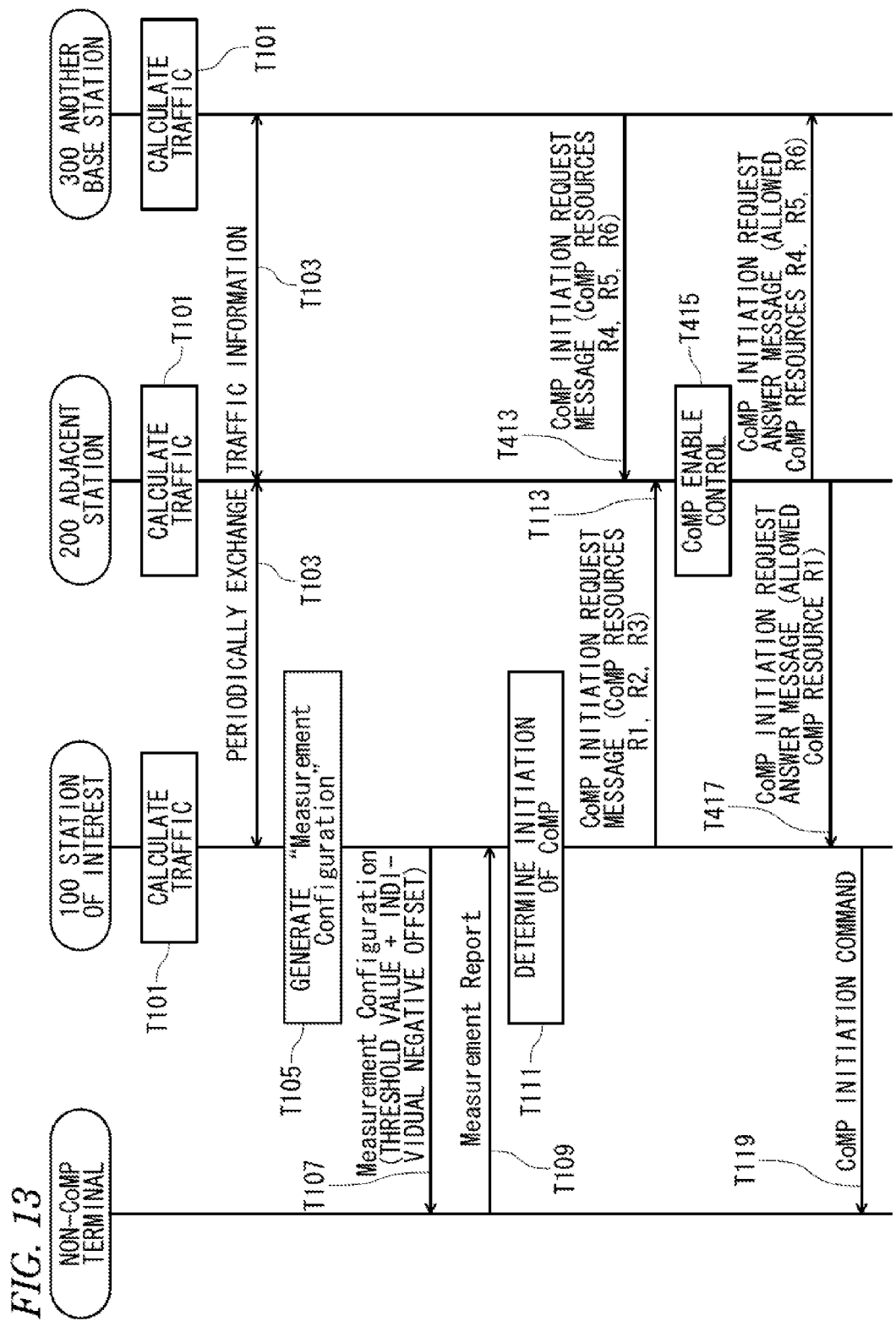
FIG. 13 is a timing chart employed in a wireless communication system of a second embodiment when the non-CoMP terminal is caused to perform a CoMP communication because the traffic of the station of interest is higher than the traffic of the adjacent base station.
Figure 14:
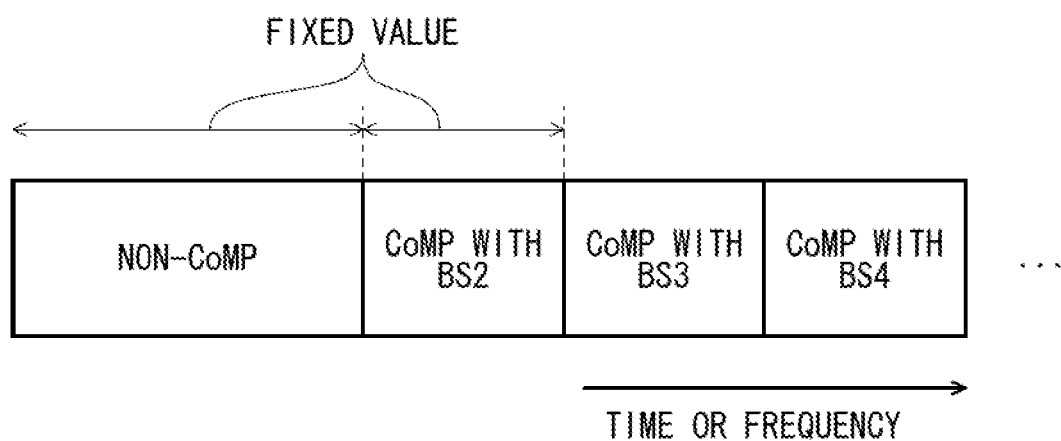
FIG. 14 is a drawing showing example allocation of resources to base stations compatible with a CoMP technique.

FIG. 13 is a timing chart employed in the wireless communication system of the second embodiment when the non-CoMP terminal is caused to perform a CoMP communication because the traffic of the station of interest is higher than the traffic of the adjacent base station. In FIG. 13, processing that is identical with processing shown in FIG. 9 is assigned the same reference numerals. As shown in FIG. 13, the station of interest 100, the adjacent station 200, and the other base station 300 each calculates traffic (T101), periodically exchanging traffic information (T103). When the station of interest 100 has transmitted to the adjacent station 200 a CoMP initiation request message including information about a CoMP resource for which a request is made to the adjacent station 200 (T113) and when the adjacent station 200 has already received another CoMP initiation request message from the other base station 300 (T413), the adjacent station 200 limits use of the resource utilized for a CoMP communication with the station of interest 100, allowing a CoMP communication (T415).

To be specific, in the example shown in FIG. 13, the CoMP initiation request message sent from the station of interest 100 to the adjacent station 200 includes information about CoMP resources R1, R2, and R3. However, the CoMP control section 213 of the adjacent station 200 allows use of only the CoMP resource R1 among the resources, whereupon the network communication section 203 of the adjacent station 200 transmits a CoMP initiation request answer message including information about the CoMP resource R1 to the station of interest 100 (T417). In this respect, the traffic information about the adjacent station 200 and a CoMP request from another base station or a status of execution of CoMP communication are taken into account as a criterion to be employed when the CoMP control section 213 of the adjacent station 200 determines a resource for allowing a CoMP communication.

As above, in the embodiment, when the base station that is to act in coordination has already received a request for a CoMP resource from another base station; the base station that is to act in coordination allows only a portion of the CoMP resource rather than allowing the request CoMP resource without modifications. For this reason, occurrence of a deficiency in the non-CoMP resource in the base station that is to act in coordination can be circumvented.

In the embodiments, the cases in which the invention is realized by hardware have been described. However, the invention may be realized by software in cooperation with the hardware.

Further, respective function blocks used in the description of the embodiments may be typically realized by an LSI that is an integrated circuit. They may be individually fabricated into one chip or a part or the whole of them may be fabricated into one chip. Here, although LSI is exemplified, it may be called an IC, a system LSI, a super LSI, an ultra LSI, or the like, depending on the difference in integrity.

Further, the technique for the integrated circuit is not limited to LSI, and may be realized as a dedicated circuit or a general purpose processor. After the LSI fabrication, a FPGA (Field Programmable Gate array) that can be programmed after fabrication of the LSI or a reconfigurable processor that can reconfigure the connection or setting of the circuit cells in the LSI may be used.

Further, if technique for an integrated circuit appears, which substitutes LSI with the progress of the semiconductor technology or other derived technologies, the function blocks may be integrated using the technologies. Biotechnology may be possibly adapted.

While the present invention has been described in detail, or with reference to the specific embodiments, it is apparent for those skilled in the art that the invention may be modified and changed in various manners without departing from the scope and spirit of the invention.

This invention is based on Japanese Patent Application (Japanese Patent Application No. 2012-004237) filed on Jan. 12, 2012, the content of which is incorporated herein by reference.

INDUSTRIAL APPLICABILITY

The wireless communication device of the invention is useful as a wireless communication base station, and the like, that can lessen load on a high traffic wireless communication device in accordance with a traffic status of each of wireless communication devices capable of utilizing a multiple point coordinated multiple point transmission/reception (CoMP) technique.

DESCRIPTIONS OF THE REFERENCE NUMERALS AND SYMBOLS

100 STATION OF INTEREST, MASTER BASE STATION
200 ADJACENT STATION, SLAVE BASE STATION
300 ANOTHER BASE STATION
150 NETWORK
101 WIRELESS COMMUNICATION SECTION
103 NETWORK COMMUNICATION SECTION
105 CONTROL SECTION
111 TRAFFIC CALCULATION SECTION
113 MEASUREMENT SETTING GENERATION SECTION
115 MEASUREMENT RESULT REPORT ACQUISITION SECTION
117 CoMP/RESOURCE CHANGE DETERMINATION SECTION
119 CoMP COMMAND GENERATION SECTION
201 WIRELESS COMMUNICATION SECTION
203 NETWORK COMMUNICATION SECTION

205 CONTROL SECTION
211 TRAFFIC CALCULATION SECTION
213 CoMP CONTROL SECTION

The invention claimed is:

1. A wireless communication device capable of performing a communication with a wireless communication terminal by utilization of a coordinated multiple point transmission/reception technique and in coordination with another wireless communication device, the wireless communication device comprising one or more integrated circuits configured to:
    calculate traffic of a wireless communication device of interest;
    transmit and receive information representing traffic of the wireless communication device of interest and information representing traffic of the other wireless communication device;
    according to a traffic status of the wireless communication device of interest and a traffic status of the other wireless communication device, make a change to a proportion of a resource for which a request is made to the other wireless communication device and which is used in communication utilizing the coordinated multiple point transmission/reception technique to a resource used in communication not utilizing the coordinated multiple point transmission/reception technique;
    when the traffic of the wireless communication device of interest is higher than traffic of the other wireless communication device while the wireless communication device of interest remains in wireless contact with the wireless communication terminal without utilization of the coordinated multiple point transmission/reception technique, generate measurement setting information including a changed parameter pertinent to a requirement by means of which there is reported a result of measurement of communication between the wireless communication device and the other wireless communication device made by the wireless communication terminal;
    when the traffic of the wireless communication device of interest is higher than the traffic of the other wireless communication device while the wireless communication device of interest remains in wireless communication with the wireless communication terminal without utilization of the coordinated multiple point transmission/reception technique,
    make a change to the parameter pertinent to the requirement such that an area over which the wireless communication terminal performs a communication by utilization of the coordinated multiple point transmission/reception technique becomes wider toward the wireless communication device of interest, and
    make a change such that, among resources allocated to the other wireless communication device, a resource used in the communication that utilizes the coordinated multiple point transmission/reception technique becomes greater in proportion.

2. The wireless communication device according to claim 1, wherein the traffic of the wireless communication device of interest is calculated based on a number of wireless communication terminals that are subordinate to the wireless communication device of interest, present in a vicinity of the other wireless communication device, and have coordinated multiple point transmission/reception technique function.

3. A wireless communication device capable of performing a communication with a wireless communication terminal by utilization of a coordinated multiple point transmission/reception technique and in coordination with another wireless communication device, the wireless communication device comprising one or more integrated circuits configured to:
    calculate traffic of a wireless communication device of interest;
    transmit and receive information representing traffic of the wireless communication device of interest and information representing traffic of the other wireless communication device;
    according to a traffic status of the wireless communication device of interest and a traffic status of the other wireless communication device, make a change to a proportion of a resource for which a request is made to the other wireless communication device and which is used in communication utilizing the coordinated multiple point transmission/reception technique to a resource used in communication not utilizing the coordinated multiple point transmission/reception technique;
    generate measurement setting information whose parameter pertinent to a requirement for reporting a result of measurement of communication between the wireless communication device of interest and the other wireless communication device performed by the wireless communication terminal is changed when the traffic of the other wireless communication device is higher than a predetermined value while the wireless communication device of interest remains in connection with the wireless communication terminal by utilization of the coordinated multiple point transmission/reception technique and in coordination with the other wireless communication device;
    when the traffic of the other wireless communication device is higher than the predetermined value while the wireless communication device of interest is connected to the wireless communication terminal in coordination with the other wireless communication device while utilizing the coordinated multiple point transmission/reception technique,
    make a change to the parameter pertinent to the requirement such that an area over which the wireless communication terminal performs a communication by utilization of the coordinated multiple point transmission/reception technique shrinks toward the other wireless communication device, and
    make a change such that, among resources allocated to the other wireless communication device, a resource used in communication that does not utilize the coordinated multiple point transmission/reception technique becomes greater in proportion.

4. The wireless communication device according to claim 1, wherein, when the traffic of the wireless communication device of interest is higher than the traffic of the other wireless communication device while the wireless communication device of interest remains in connection with the wireless communication terminal by utilization of the coordinated multiple point transmission/reception technique and in coordination with the other wireless communication device, a change is made to the parameter pertinent to the requirement such that the area over which the wireless communication terminal performs a communication by utilization of the coordinated multiple point transmission/reception technique shrinks toward the wireless communication device of interest.

5. A communication control method that is carried out by a base station configured to communicate with a wireless communication terminal, the method comprising:

calculating traffic of a base station of interest, to which the wireless communication terminal is connected, wherein the base station of interest is one a plurality of base stations configured to perform a communication with the wireless communication terminal using a coordinated multiple point transmission/reception technique and in coordination with another base station;

transmitting and receiving information representing traffic of the base station of interest and traffic of the other base station; and, when the traffic of the base station of interest is higher than traffic of the other base station while the base station of interest remains in wireless communication with the wireless communication terminal without utilizing the coordinated multiple point transmission/reception technique, making a change to a parameter pertinent to a requirement by means of which there is reported a result of measurement of communication between the base station of interest and the other base station made by the wireless communication terminal, such that an area over which the wireless communication terminal performs a communication by utilization of the coordinated multiple point transmission/reception technique becomes wider toward the base station of interest, and making a change such that a resource, among resources allocated to the other base station, used in communication that utilizes the coordinated multiple point transmission/reception technique becomes greater in proportion.

6. A communication control method that is carried out by a base station configured to communicate with a wireless communication terminal, the method comprising:

calculating traffic of a base station of interest, wherein the base station of interest is one a plurality of base stations configured to perform a communication with the wireless communication terminal using a coordinated multiple point transmission/reception technique and in coordination with another base station;

transmitting and receiving information representing traffic of the base station of interest and traffic of the other base station; and, when the traffic of the other base station is higher than a predetermined value while the base station of interest remains connected to the wireless communication terminal in coordination with the other base station and by utilization of the coordinated multiple point transmission/reception technique, making a change to a parameter pertinent to a requirement such that an area over which the wireless communication terminal performs communication by utilization of the coordinated multiple point transmission/reception technique shrinks toward the other base station, and making a change such that, among resources allocated to the other base station, a resource used in a communication that does not utilize the coordinated multiple point transmission/reception technique becomes greater in proportion.

\* \* \* \* \*